(12) United States Patent
Dahl et al.

(10) Patent No.: US 11,391,334 B2
(45) Date of Patent: **\*Jul. 19, 2022**

(54) BRAKE CALIPER TOOL

(71) Applicant: A&E Incorporated, Racine, WI (US)

(72) Inventors: Vincent Dahl, Kenosha, WI (US); Jeffrey J Kuzmic, Wind Lake, WI (US); Timothy J Alho, Pleasant Prairie, WI (US)

(73) Assignee: A & E INCORPORATED, Racine, WI (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/872,827

(22) Filed: May 12, 2020

(65) Prior Publication Data

US 2020/0393008 A1 Dec. 17, 2020

Related U.S. Application Data

(63) Continuation-in-part of application No. 15/598,093, filed on May 17, 2017, now Pat. No. 10,711,856.

(60) Provisional application No. 62/859,964, filed on Jun. 11, 2019.

(51) Int. Cl.
| | |
|---|---|
| *F16D 65/00* | (2006.01) |
| *B25B 13/46* | (2006.01) |
| *B25B 27/00* | (2006.01) |
| *B25B 27/02* | (2006.01) |

(52) U.S. Cl.
CPC .......... *F16D 65/0043* (2013.01); *B25B 13/46* (2013.01); *B25B 27/0021* (2013.01); *B25B 27/0035* (2013.01); *B25B 27/023* (2013.01); *F16D 65/0068* (2013.01)

(58) Field of Classification Search
CPC ......... Y10T 29/53848; Y10T 29/53857; Y10T 29/53891; Y10T 29/53796; Y10T 29/53683; B25B 27/0021; B25B 27/0035; B25B 27/14; B25B 5/068; B25B 5/10; B25B 5/102; F16D 65/0043
See application file for complete search history.

(56) References Cited

U.S. PATENT DOCUMENTS

| | | | |
|---|---|---|---|
| 1,339,448 A | 5/1920 | Foreman |
| 2,170,535 A | 8/1939 | Marsden |
| 2,650,735 A | 9/1953 | Redmond |
| 3,835,522 A | 9/1974 | Ward |
| 4,744,132 A | 5/1988 | Greene |
| 5,018,261 A | 5/1991 | Markons |
| 5,269,053 A | 12/1993 | Hicks |

(Continued)

OTHER PUBLICATIONS

A&E Incorporate drawing sheet entitled Disc Brake Tool with Wrench; Part No. DV-3251; dated Feb. 21, 2011.

(Continued)

*Primary Examiner* — Tyrone V Hall, Jr.
*Assistant Examiner* — Makena S Markman
(74) *Attorney, Agent, or Firm* — Ryan Kromholz & Manion, S.C.

(57) ABSTRACT

A tool for retracting pistons into cylinder bores is disclosed, with a narrow gap between facing pressure plates allowing use of the tool in tight places, and ratcheting spreading of the facing pressure plates causing outward moving of the pistons, enabling work to be performed, wherein movement of a threaded stud through a coupler moves a first pressure plate.

4 Claims, 4 Drawing Sheets

(56) References Cited

U.S. PATENT DOCUMENTS

| | | | |
|---|---|---|---|
| 5,829,739 A | 11/1998 | Hofmann | |
| 6,085,398 A | 7/2000 | Arch | |
| 6,192,566 B1 | 2/2001 | Dunum | |
| D457,795 S | 5/2002 | Kelvin | |
| 6,574,846 B1 | 6/2003 | Kang | |
| 6,678,931 B1 | 1/2004 | Tatasciore | |
| 6,925,696 B1 | 8/2005 | Williams | |
| 7,155,792 B1 | 1/2007 | Miller, Jr. | |
| 7,996,972 B2 | 8/2011 | Chih | |
| 8,393,063 B2 | 3/2013 | Hodges | |
| 8,505,177 B2 | 8/2013 | Chen | |
| 8,621,692 B1 | 1/2014 | Kring | |
| 8,661,638 B2 | 3/2014 | Chen | |
| 8,661,639 B2 | 3/2014 | Bondielli | |
| 8,826,504 B1* | 9/2014 | Slivon | B25B 27/0035 29/239 |
| 9,174,330 B2 | 11/2015 | Chen | |
| 9,309,937 B2 | 4/2016 | Chen | |
| 9,376,300 B2 | 6/2016 | Yang | |
| 9,683,620 B2 | 6/2017 | Buchanan | |
| 9,695,893 B2 | 7/2017 | Huang | |
| 10,156,273 B1* | 12/2018 | Huang | F16D 65/0043 |
| 10,371,220 B2* | 8/2019 | Wu | B25B 13/463 |
| 10,711,856 B2* | 7/2020 | Dahl | F16D 65/0043 |
| 10,807,220 B2* | 10/2020 | Hernandez, Jr. | B25B 27/0035 |
| 2004/0123438 A1* | 7/2004 | Kang | B25B 27/0021 29/239 |
| 2004/0134052 A1 | 7/2004 | Ploeger | |
| 2005/0000073 A1 | 1/2005 | Ploeger | |
| 2011/0010906 A1 | 1/2011 | Mitchell | |
| 2011/0179616 A1 | 7/2011 | Oachs | |
| 2012/0108112 A1 | 5/2012 | Vernica | |
| 2012/0204393 A1 | 8/2012 | Gentner | |
| 2018/0335097 A1 | 11/2018 | Dahl | |

OTHER PUBLICATIONS

Alltools WA Pty Ltd: Online Shop; Disc brake pad spreader; .alltools.com.au/shop/index.php/556/2453-Disc-Brake-Pad-Spreader; Jul. 16, 2010.

Snap-on; Pad Spreader, ://buy1.snapon.com/catalog/printPage.asp?tool=all&item-id=12411&PartNo=YA244; Dec. 10, 2010.

Snap-on; Press, Break Piston, ://buy1.snapon.com/catalog/printPage.asp?tool=all&item-id=72215&PartNo=BT350'; Dec. 10, 2010.

Snap-on; Press, Break Caliper, ://buy1.snapon.com/catalog/printPage.asp?tool=all&item-id=88695&PartNo=BTCP1; Dec. 10, 2010.

Snap-on; Spreader (for standard 4-piston caliper disc brakes); ://buy1.snapon/catalog/printPage.asp?tool=all&item-id=12412&PartNo=GA395; Dec. 10, 2010.

Snap-on; Tool, Universal Break Caliper, Left Hand Thread, ://buy1.snapon/catalog/printPage.asp?tool=all&item-id=75281&PartNo=YA642; Dec. 10, 2010.

The Tool Warehouse, CalVan Tools 700 Heavy-Duty Universal Disc Brake Pad Spreader; .the toolwarehouse.net/shop/media/TN-CAL-700.jpg; Jul. 3, 2008.

Toolfetch; CalVan Tools 700 Heavy-Duty Universal Disc Pad Spreader; .toolfetch.com/Catagory/Automotive/Brake-Tools/CAL700.htm; Jul. 16, 2012.

* cited by examiner

BRAKE CALIPER TOOL

RELATED APPLICATIONS

This application claims the benefit of provisional application Ser. No. 62/859,964 filed 11 Jun. 2019 and is a continuation-in-part of application Ser. No. 15/598,093 filed 17 May 2017 (now U.S. Pat. No. 10,711,856).

BACKGROUND OF THE INVENTION

In the repair of motorcycles and smaller automotive vehicles and, more particularly, with respect to the repair of vehicle braking systems, having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a vehicle operator activates a foot brake or a handle brake, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brae pads can be replaced. The caliper housing can then be reinstalled in the wheel assembly and positioned with the new brake pads adequately accommodated in the caliper housing for engagement with the rotor.

A variety of spreader and brake press tools are known to be used by mechanics responsible for the repair of disc brakes and the replacement of brake pads. A difficulty with these tools, however, is the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present, disclosure relates to a disc brake piston retractor tool for retracting at least one piston into at least one cylinder bore of a caliper assembly provided with a set of brake pads to be serviced. Because of the particular threaded relationship between a threaded stud and a coupler, it should be understood that rotation of the coupler in clockwise or counterclockwise directions will result in simultaneous lateral movement of the threaded stud through the coupler. Movement of the threaded stud through the coupler moves a first pressure plate.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is disclosed in the application.

Figure 1:
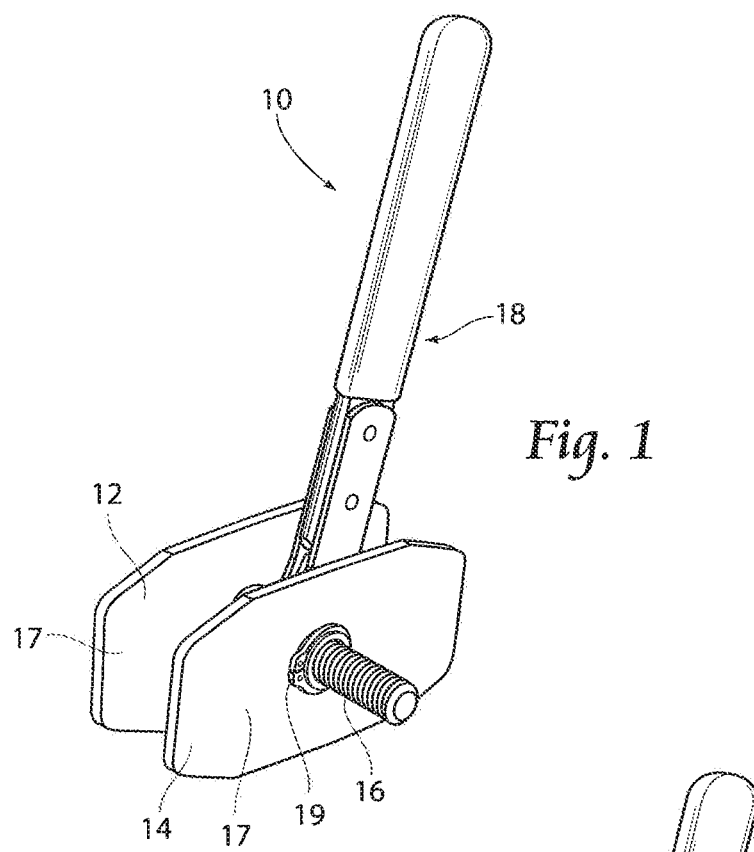
FIG. 1 is a perspective view of a disc brake piston retractor tool according to the present invention.

Referring now to the drawings, FIG. 1 illustrates a hand tool in the form of a disc brake piston retractor tool 10 used for compressing one or more pistons 142 (See FIGS. 6, 7) into a caliper housing 140 (See FIGS. 6, 7) when replacing a set of brake pads installed therein.

The disc brake piston retractor tool 10 is generally comprised of a first pressure plate 12, a second pressure plate 14, a coupler 36 (See FIG. 2) interconnecting the first and second pressure plates (12, 14), a reversible ratchet wrench assembly 18 connected to the coupler 36, and a snap ring 10 removably connected to said coupler 36.

Figure 2:
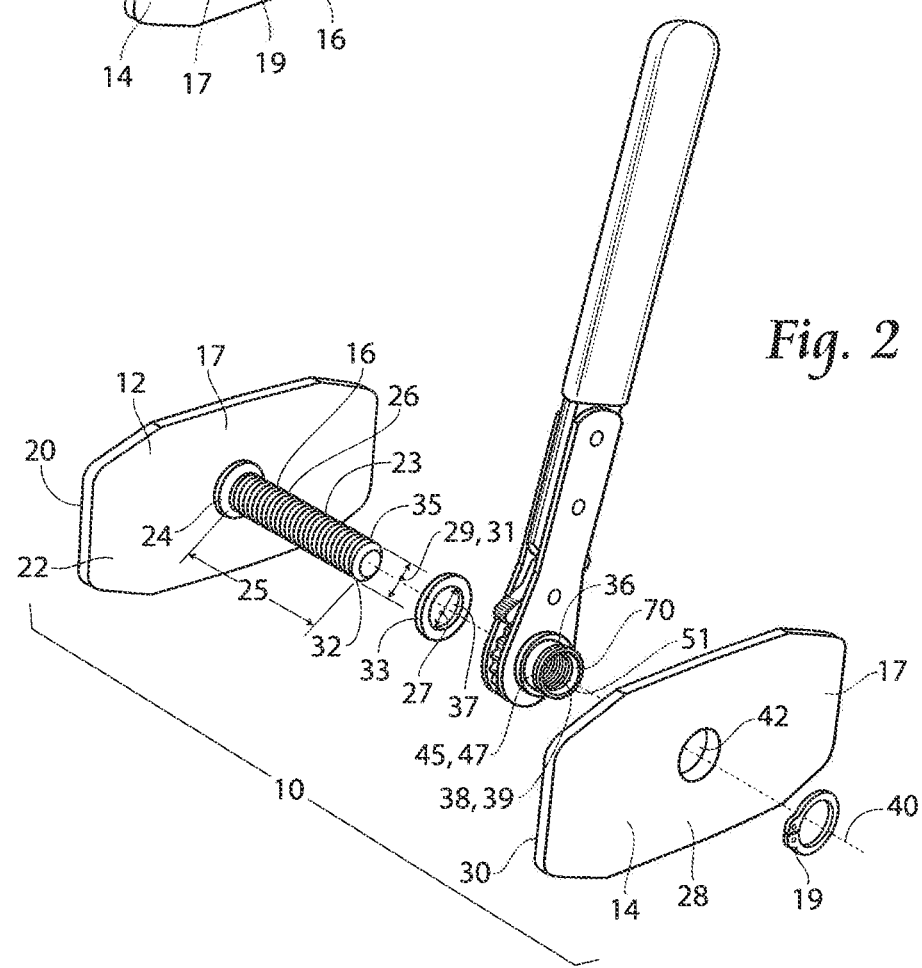
FIG. 2 is an exploded view of the disc brake piston retractor tool of FIG. 1.

Referring to FIGS. 1-2, the pressure plates (12, 14) are substantially identical in shape and thickness and are preferably constructed of steel. The pressure plates (12, 14) preferably have a planar configuration 17. The pressure plates (12, 14) preferably have an octagonal shape. Alternatively, the pressure plates (12, 14) may have any geometric shape. The first pressure plate 12 has an cuter surface 20 and an inner surface 22 provided with a threaded stud 16 with external threads 26 about an cuter circumference 23 of the threaded stud 16 along at least substantially a threaded stud length 25. A threaded stud first end 24 is preferably fixed to the first pressure plate 12 inner surface 22. Alternatively, the threaded stud first end 24 is in removable communication with the first pressure plate 12 inner surface 22. The threaded stud 16 the extending substantially perpendicular from the inner surface 22 along the threaded stud length 25. Wherein coupler 36 and threaded stud 16 are coupled to the first pressure plate 12.

An o-ring 33 is removably positioned about the outer circumference 23 of the threaded stud 16. The o-ring 33 having an o-ring inner diameter 27. Wherein the o-ring inner diameter 27 provides for the threaded stud 16 to be inserted into the o-ring opening 37 defined by the o-ring inner diameter 27. A threaded stud outer diameter 29 is defined by an outer diameter distance 31 between an apex 32 of the external threading 26 and a diametrically opposed apex 35 of the external threading 26. Wherein the threaded stud outer diameter 29 is preferably less than the o-ring inner diameter 27. Alternatively, the threaded stud outer diameter 29 is substantially equal to the o-ring inner diameter 27. The o-ring 33 is preferably in close proximity to the first pressure plate 12 inner surface 22. Alternatively, the o-ring 33 is abutting the first pressure plate 12 inner surface 22. The o-ring 33 is preferably made of nylon. Wherein the o-ring 33 reduces wear on at least one of the reversible ratchet wrench assembly 18 and the first pressure plate 12 when the reversible ratchet wrench assembly 18 and the first pressure plate 12 are in close proximity and the reversible ratchet wrench assembly 18 is being operated.

Threaded stud 16 is mated through coupler 36, preferably threaded into internal coupling threads 38 of the coupler 36. Wherein the coupler 36 has a cylindrical hollow body 70. The coupler 36 has an internal coupling surface 39 wherein the internal coupling threads 38 preferably define substantially all the internal coupling surface 39. Alternatively, the internal coupling threads 38 define less than substantially all the internal coupling surface 39. Thus, the coupler 36 is directly engaged with the reversible ratchet wrench assembly 18. The internal coupling threads 38 matingly receive the external threading 26 of the threaded stud 16

The second pressure plate 14 has an outer surface 28 and an inner surface 30 provided with a first hole 54 and a second pressure plate hole 42, both extending from the inner surface 30 through the outer surface 28.

Figure 6:
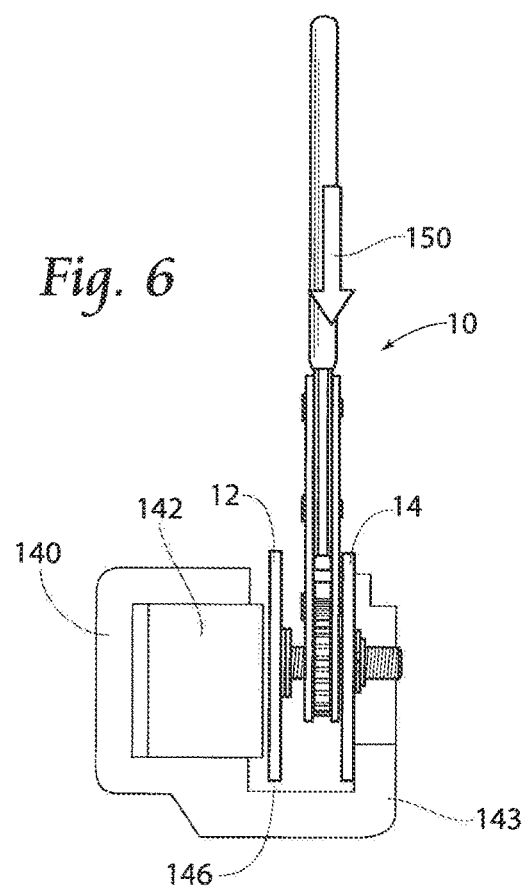
FIG. 6 is a front, in-use view of the disc brake piston retractor tool in FIG. 1.
Figure 7:
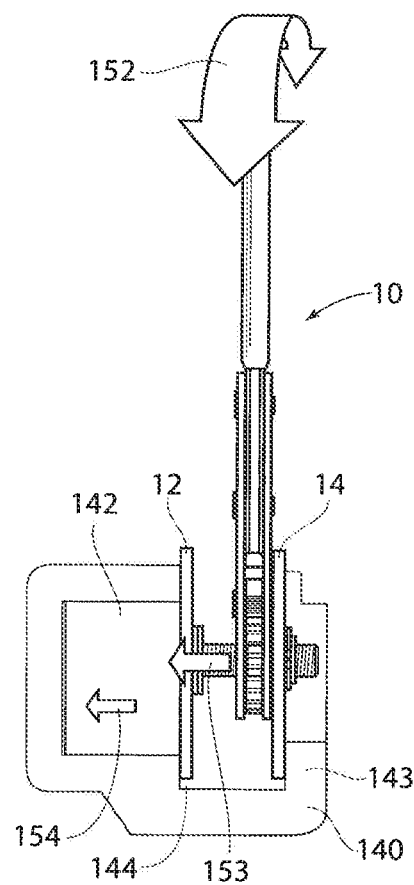
FIG. 7 is a front, in-use view of the disc brake piston retractor tool in FIG. 1, operating upon a brake caliper.

The coupler 36 preferably extends through the second pressure plate hole 42 beyond the outer surface 28 of the second pressure plate 14. The coupler 36 is retained within the second pressure plate hole 42 by the snap ring 19, placed about a periphery 47 of the coupler 36 extending beyond the outer surface 28. The snap ring 19 is preferably in removable communication with a coupler annular groove 45 located about the periphery 47 of the coupler 36. The coupler annular groove 45 is preferably located at a coupler first end 51. Coupler 36 is thus rotatably mounted relative to the threaded stud 16 and the first and second pressure plates (12, 14) about an axis 40 that is perpendicular to the pressure plates (12, 14). Because of the particular threaded relationship among the threaded stud 16 with the coupler 36, it should be understood that rotation of the coupler 36 in clockwise or counterclockwise direction will result in simultaneous lateral movement of the threaded stud 16 through the coupler 36. The movement of the threaded stud 16 through the coupler 36 moves the first pressure plate 12 to either an extended position (FIG. 7, 144) of the disc brake piston retractor tool 10 as illustrated in FIG. 7, or a retracted position (FIG. 6, 146) of the disc brake piston retractor tool 10 as illustrated in FIGS. 1 and 6.

Figure 3:
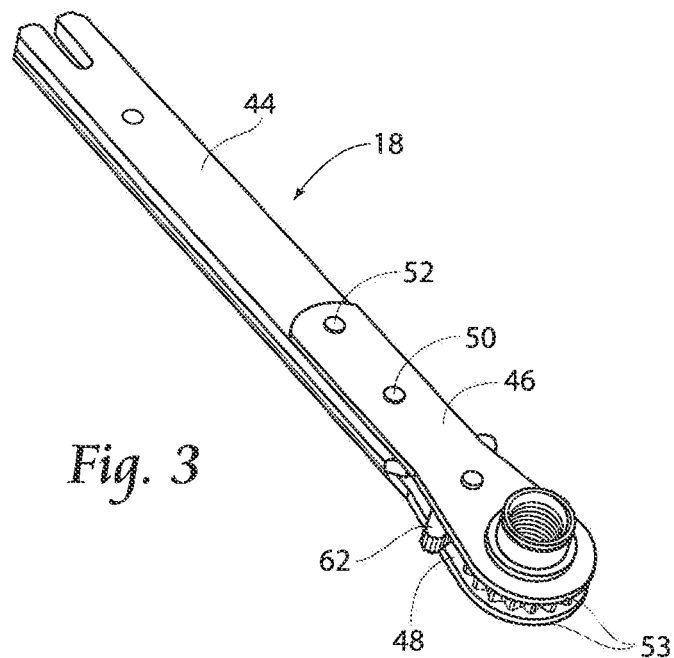
FIG. 3 is a perspective view of a reversible ratchet wrench assembly of the tool shown in FIG. 1.
Figure 4:
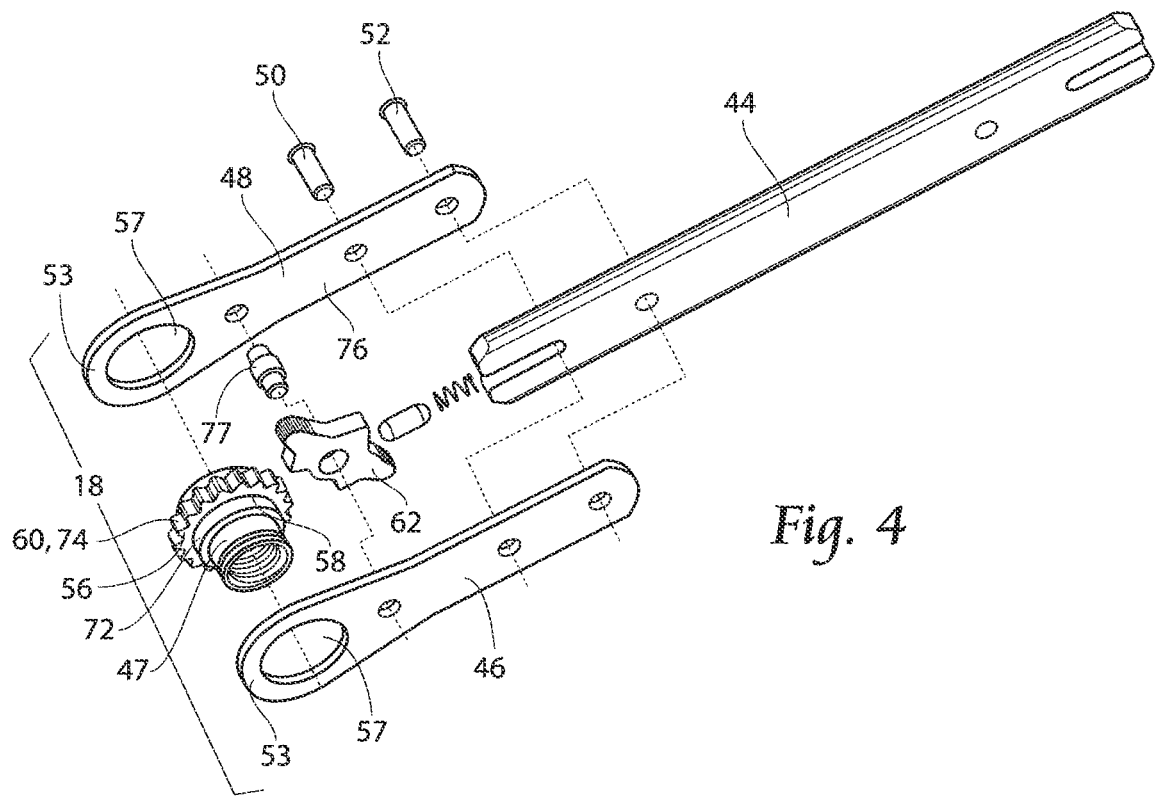
FIG. 4 is ah exploded view of the reversible ratchet wrench assembly shown in FIG. 3.
Figure 5:
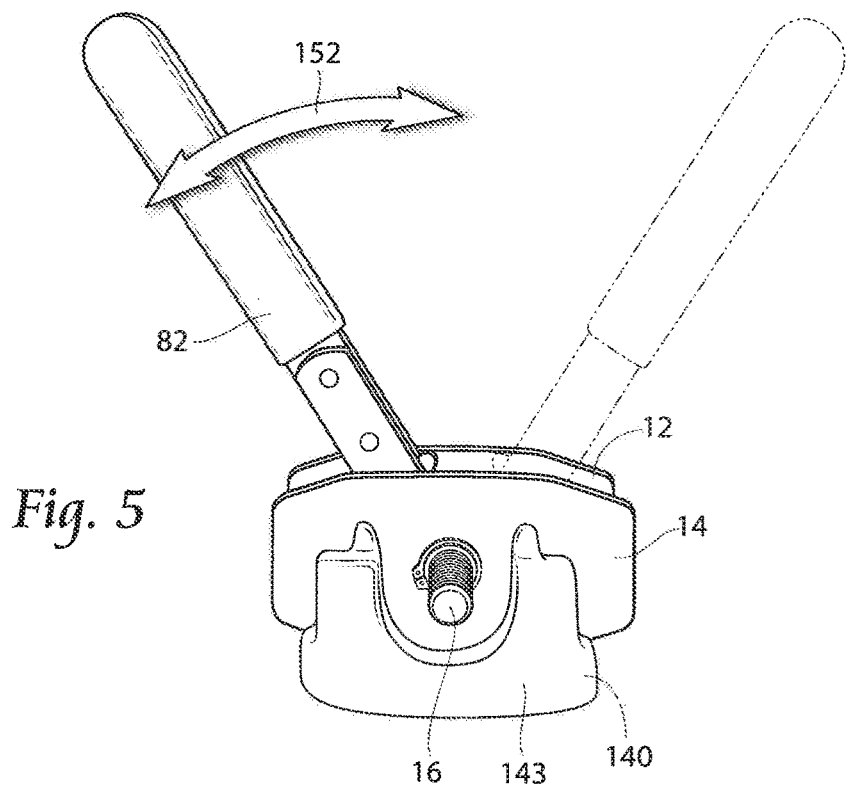
FIG. 5 is a side, in-use view of the disc brake piston retractor tool in FIG. 1, operating upon a brake caliper.

Referring to FIGS. 3 and 4, the reversible ratchet wrench assembly 18 shown is operated similarly to that shown in U.S. Pat. No. 6,626,504, incorporated herein by reference. As there described, the reversible ratchet wrench assembly 18 is incorporated into the disc brake piston retractor tool 10 in order to simplify the bi-directional rotation of the coupler 36, and the selective movement of the first pressure plate 12. The reversible ratchet wrench assembly 18 includes an elongated handle bar 44 which is rigidly interconnected between a first handle plate 46 and a second handle plate 48 by a pair of rivets 50, 52. Ref. FIG. 5, a handle 82 fits over the elongated handle bar 44 to provide for ease of operating the reversible ratchet wrench assembly 18. The handle plates (46, 48) are held spaced apart at their front ends 53 by the elongated handle bar 44, and are provided with aligned central apertures 57 which receive the coupler 36 so that the handle plates (46, 48) may rotate about the periphery of coupler 36 during ratcheting of the reversible ratchet wrench assembly 18.

A ratcheting wheel 56 has a central hole formed by a circular inner wall 58 which is fixed to the periphery 47 of the coupler 36 in the center area 72 thereof. The ratcheting wheel 56 has a ratcheting wheel outer periphery 74 formed with a plurality of spaced apart ratchet notches 60. The ratcheting wheel 56 is positioned between facing inner surfaces 76 of the spaced apart handle plates (46, 48), and is designed to rotate in fixed relationship with the coupler 36 relative to the threaded stud 16 threaded therein.

A reversible pawl 62 is mounted for pivotal movement between the spaced part handle plates (46, 48) on a rivet 77 which further joins the handle plates (46, 48).

When assembled, appropriate setting of the pawl 62 and rotation of the reversible ratchet wrench assembly 18 will cause the threaded stud 16 to be threaded or unthreaded relative to the coupler 36 so that the spacing between the pressure plates (12, 14) can be adjusted between a retracted position (FIGS. 1 and 6) and an extended position (FIG. 7). During the retracting or extending process, movement of the threaded stud 16 through the coupler 36 moves the first pressure plate 12. At least one of positioning of the second pressure plate 14 against the caliper housing 140 and the rotation of the internal coupler threads 38 about the external threading 26 provides for restricting the rotation of toe pressure plates (12, 14). Wherein, the coupler 36 and the reversible ratchet wrench assembly 18 are rotatable about the axis 40 which is perpendicular to the pressure plates (12, 14).

Figure 8:
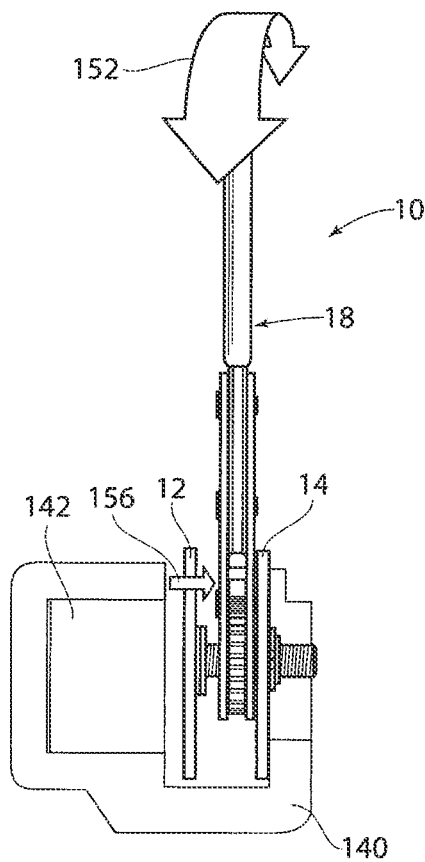
FIG. 8 is a front, in-use view of the disc brake piston retractor tool in FIG. 1, retracting a first pressure plate.

Use of the disc brake piston retractor tool 10 is illustrated in FIGS. 5-7. When it is desired to replace a set of worn brake pads, which preferably have been disassembled from a caliper housing 140 removed from a wheel assembly, the disc brake piston retractor tool 10 in a retracted position is placed within an interior space of the caliper housing 140 such that second pressure plate 14 is engaged against a fixed wall 143 of the caliper housing 140, and first pressure plate 12 is facing one or more of the outwardly extending pistons 142 projecting opposite the fixed wall 143 (150). The reversible ratchet wrench assembly 18 is then operated (152). The operation of the reversible ratchet wrench assembly 18 moves the first pressure plate 12 progressively outwardly towards the extended position (153). In doing so, the first pressure plate 12 pushes the one or more pistons 142 back into their initial position within their cylinder(s) associated with the caliper housing 140 (154). Ref. FIG. 8, Once the pistons 142 have been retracted, the brake piston retractor tool 10 can be removed from the caliper housing 140 by reversing the direction of the reversible ratchet wrench assembly 18 (156), and operating the reversible ratchet wrench assembly 18 (152). The pressure on the pistons 142 is usually inadequate or released such that pad mounting surfaces on the pistons 142 remain in an acceptable spread condition. The brake pads may then be easily replaced and the caliper housing 140 may be reassembled with the wheel assembly.

Although not illustrated, it should be understood that certain caliper housings are designed with one set of pistons on one wall, and another set of pistons on another wall spaced from the one wall so that the sets of pistons are spaced apart and face each other. In this case, the brake piston retractor tool 10 is placed in the caliper housing such that one pressure plate 12 is designed to push against and retract the one set of pistons into their respective cylinder bores.

The foregoing is considered as illustrative only of the principles of the invention. Furthermore, since numerous modifications and changes will readily occur to those skilled, in the art, it is not desired to limit the invention to the exact construction and operation shown and described.

While the preferred embodiment has been described, the details may be changed without departing from the invention, which is defined by the claims.

We claim:

1. A disc brake piston retractor tool comprising:
a first pressure plate carrying a threaded stud;
a reversible wrench assembly operably connected to said threaded stud,
a second pressure plate comprising a void space for receiving said threaded stud through said second pressure plate;
said stud secured to said second pressure plate;
a coupler carried by said reversible wrench assembly, and said coupler interconnecting said first and second pressure plates through said void space.

2. A disc brake piston retractor tool according to claim 1, said reversible wrench assembly comprising a ratcheting wrench.

3. A disc brake piston retractor tool comprising:
a first pressure plate carrying a threaded stud;
a reversible wrench assembly operably connected to said threaded stud,
a second pressure plate comprising a void space for receiving said threaded stud through said second pressure plate;
said stud secured to said second pressure plate by a snap ring carried by said threaded stud, said snap ring connected to a coupler carried by said reversible wrench assembly.

4. A tool for retracting at least one piston into a mating cylinder bore of a caliper assembly provided with a set of brake pads to be serviced, the tool comprising:
a first pressure plate having an outer surface, and an inner surface;
a second pressure plate having an outer surface, and an inner surface;
a coupler joining the first pressure plate with the second pressure plate, the coupler comprising:
an internally threaded bore coupled to said first pressure plate along an axis perpendicular to the first pressure plate;
a stud affixed to the second pressure plate along the axis such that the stud cannot rotate about, nor move along, the axis in relation to the second pressure plate, the stud defining an external thread, wherein the stud is threadedly inserted into said internally threaded bore;
a ratcheting wrench assembly connected to said internally threaded bore for providing selective reversible rotation of said internally threaded bore relative to at least one of the first pressure plate and the second pressure plate;
a snap ring coupled with a coupler annular groove located about an outer periphery of said internally threaded bore;
whereby selective rotation of the ratcheting wrench assembly causes threading and unthreading of the stud in the bore and movement of the second pressure plate along the axis in relation to the first pressure plate.

* * * * *